United States Patent [19]
Belcher et al.

[11] Patent Number: 5,774,502
[45] Date of Patent: Jun. 30, 1998

[54] FULLY INTEGRATED DATA RECEIVER AND METHOD FOR RECEIVING ON/OFF KEYED AM/PDSK MODULATED SIGNALS

[75] Inventors: Donald K. Belcher, Rogersville, Tenn.; Albert D. Darby, Jr., Valkaria; Alexander J. Nadler, Melbourne, both of Fla.

[73] Assignee: Harris Corporation, Melbourne, Fla.

[21] Appl. No.: 752,028

[22] Filed: Nov. 19, 1996

[51] Int. Cl.⁶ .............................. H03D 5/00; H03K 9/00
[52] U.S. Cl. .................... 375/283; 375/269; 375/316; 375/320; 375/330; 455/334; 455/337
[58] Field of Search ..................... 375/269, 283, 375/309, 300, 308, 310, 311, 315, 320, 330, 324, 316, 340, 259; 455/334, 337

[56] References Cited

U.S. PATENT DOCUMENTS

| | | | |
|---|---|---|---|
| 4,656,432 | 4/1987 | Matsumura | 375/324 |
| 5,285,482 | 2/1994 | Sehier et al. | 375/330 |
| 5,416,803 | 5/1995 | Janer | 375/324 |

*Primary Examiner*—Stephen Chin
*Assistant Examiner*—Betsy L. Deppe
*Attorney, Agent, or Firm*—Rogers & Killeen

[57] ABSTRACT

A data transmission system in which an on/off keyed (OOK) AM/DPSK modulated data signal with an on/off ratio exceeding about 80 dB which has been modulated on a carrier is received at a compact, easily fabricated and battery powered data receiver which operates without automatic gain control and which includes a double loop antenna (diameter of about two inches) with a trimmer capacitor center tapped to the antenna for providing a conjugate impedance match between the antenna and a low noise amplifier. In the receiver, a square-law detection AM demodulator for demodulating the amplified signal is in a bipolar silicon IC, and a DPSK data detector for decoding the demodulated signal is in a separate digital CMOS IC.

22 Claims, 2 Drawing Sheets

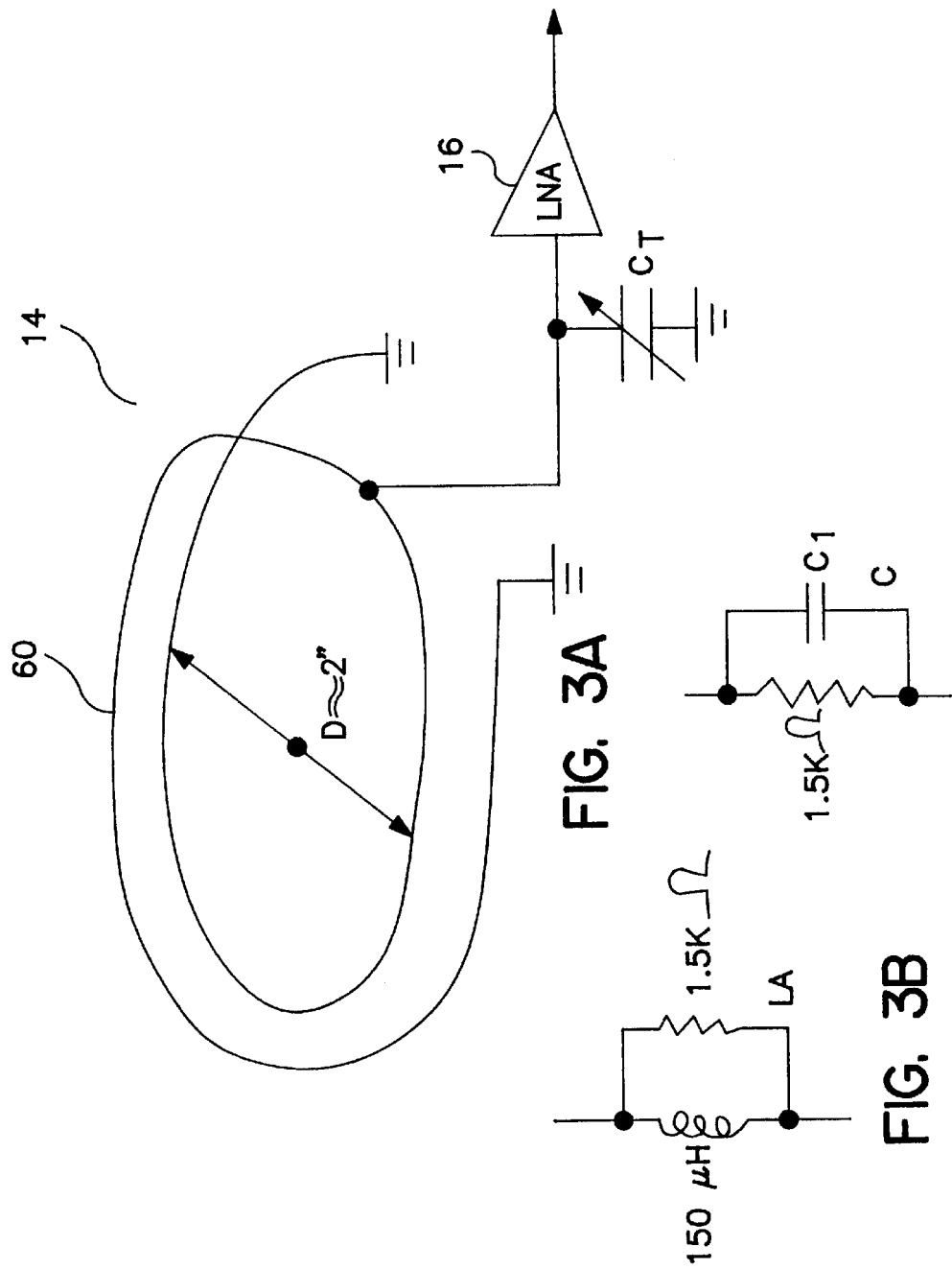

FULLY INTEGRATED DATA RECEIVER AND METHOD FOR RECEIVING ON/OFF KEYED AM/PDSK MODULATED SIGNALS

BACKGROUND OF THE INVENTION

The present invention relates to data communication systems, and more particularly to a compact data communication system receiver for use in a variety of portable applications, such as beepers, which require small size, low power consumption and low cost components.

Data communication systems use a variety of techniques to communicate digital data which may be tailored to a particular application. Some of these applications, such as those to which the present invention are directed, are designed for portable use by the general public and are desirably battery powered (thus with low power consumption), compact, rugged, low cost and easily fabricated. Beepers are an example of such devices.

Prior art data communication devices, particularly portable data receivers, may be acceptable for some uses, but it has been found that the present invention improves upon their performance by providing one or more of the following advantages:

- a monolithic architecture which is designed for implementation in a low-cost silicon integrated circuit (IC),
- an on/off keyed (OOK) AM/differential phase-shift keyed (DPSK) waveform which is well suited for high performance data communication in battery powered electronics,
- a wide dynamic range AM receiver architecture without the added complexity of automatic gain control (AGC) typically found in AM receivers,
- a square-law AM detection which improves receiver performance at low signal-to-noise ratios (SNR),
- a DPSK digital demodulator which uses a simple monolithic delay and multiply technique for digital data detection, and
- a dual purpose, center-tapped antenna and impedance matching network which reduces adjustments during production.

Accordingly, it is an object of the present invention to provide a novel device and method for data communication which incorporates one or more of these advantages, thereby obviating the problems of the prior art.

It is another object of the present invention to provide a novel data transmission system and method for transmitting an OOK AM/DPSK modulated data signal with an on/off ratio exceeding about 80 dB which has been modulated on a carrier, and which has a compact and easily fabricated, battery powered data receiver which operates without automatic gain control and which includes a double loop antenna with a trimmer capacitor center tapped to the antenna for providing a conjugate impedance match.

It is yet another object of the present invention to provide a novel data receiver an antenna with a double loop of antenna wire center tapped to a trimmer capacitor for receiving an on/off keyed (OOK) AM/DPSK modulated data signal with an on/off ratio exceeding about 60 dB which has been modulated on a carrier, with an AM demodulator circuit in a bipolar silicon IC having therein a square-law detection AM demodulator for demodulating the amplified signal, and with a DPSK data detector circuit in a digital CMOS IC.

It is still another object of the present invention to provide a novel data communication method in which a 300 Hz data signal is DPSK modulated and on/off keyed at a 1.2 KHz AM rate with an on/off ratio of at least 60 dB, the OOK AM/DPSK signal is thereafter modulated onto a 49 MHz carrier, and the signal is transmitted and thereafter received on a double loop wire antenna which provides a conjugate impedance match with a low noise amplifier connected thereto, and the signal is demodulated with a square-law detection AM demodulator in a bipolar silicon IC and decoded with a DPSK data detector circuit in a digital CMOS IC.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 3a is a part pictorial representation and part circuit diagram of an embodiment of the antenna and low noise amplifier of the present invention.

FIG. 3b is a circuit diagram of the circuit equivalent of the antenna of FIG. 3a when loaded.

FIG. 3c is a circuit diagram of the circuit equivalent of the low noise amplifier of FIG. 3a.

DESCRIPTION OF PREFERRED EMBODIMENTS

Figure 1:
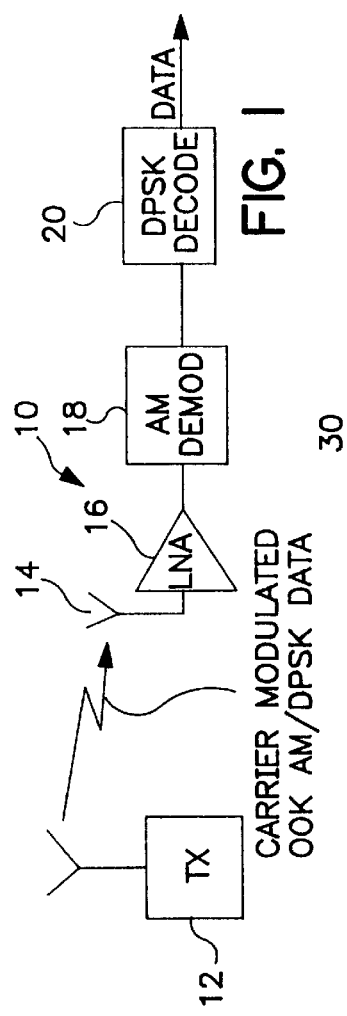
FIG. 1 is a partial circuit diagram of an embodiment of the data communication system of the present invention.

With reference now to FIG. 1, an embodiment of the present invention is a data transmission system 10 having a transmitter 12 for transmitting an on/off keyed (OOK) AM/DPSK modulated data signal with an on/off ratio exceeding about 60 dB (preferably exceeding about 80 dB) which has been modulated on a carrier, and a data receiver which operates without automatic gain control. The receiver may have an antenna 14 with a double loop of antenna wire, as will be further discussed in relation to FIG. 3, connected to a low noise amplifier 16. A square-law detection AM demodulator 18 for demodulating the amplified signal may receive the signal from low noise amplifier 16 and provide an output to a DPSK demodulator/data detector circuit 20 for digitally decoding the demodulated signal to provide the data signal as an output.

Transmitter 12 may be a conventional data transmitter capable of transmitting the above-described OOK AM/DPSK signal, and its method of providing the signal is not significant to the invention herein.

Figure 2:
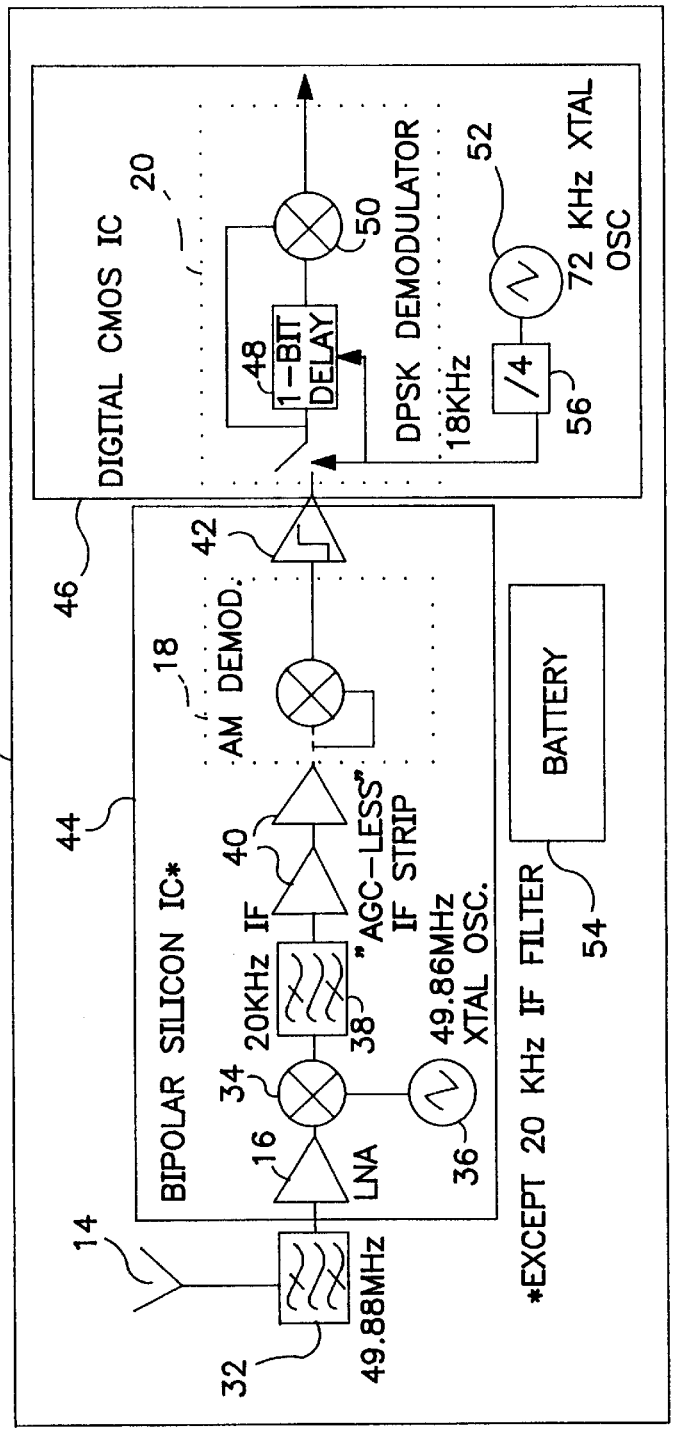
FIG. 2 is a partial circuit diagram of an embodiment of the receiver of the present invention.

The present invention is more particularly directed to an embodiment of the compact receiver for the OOK AM/DPSK signal, such as illustrated in FIG. 2. The receiver may be enclosed in a portable container 30 and include antenna 14 for providing a received signal to a carrier filter 32 which provides the filtered signal to low noise amplifier 16. The signal from amplifier 16 may be provided to a mixer 34 which receives a signal at the carrier frequency from an oscillator 36 for reducing the signal to an intermediate frequency. An intermediate frequency filter 38 provides the signal through further amplifiers 40 and then to AM demodulator 18 and amplifier 42. In a preferred embodiment a single IC 44 contains amplifier 16, mixer 34, oscillator 36, amplifiers 40 and 42, and AM demodulator 18 (filter 38 may be separate.)

The signal from IC 44 may be provided to a further single IC 46 in a preferred embodiment. IC 46 may contain DPSK demodulator 20 and its associated components, namely a one bit delay 48, mixer 50, and oscillator 52. A battery 54 may be provided to power all of the components in portable container 30.

The above-described components may be conventional. Square-law AM demodulator 18 is preferably a micropowered adaptation of a Gilbert-cell. DPSK demodulator 20 is preferably uses a delay and multiply method in which the incoming data stream is delayed by one bit and multiplied by the undelayed signal. In a preferred embodiment DPSK demodulator 20 uses less than 500 gates in a low-cost 1 micron CMOS IC process.

In a preferred embodiment the data signal has a frequency of about 300 Hz, the on/off keying AM rate is about 1.2 KHz, the carrier has a frequency of about 49 MHz, and the intermediate frequency is about 20 KHz; IC 44 is 800 MHz bipolar silicon and IC 46 is 1 micron digital CMOS; oscillator 36 operates at about 49 MHz and oscillator 52 operates at about 72 KHz and has an output divided by 4 in divider 56. Other appropriate frequencies may be used.

With reference now to FIG. 3a, an embodiment of antenna 14 may include a dual purpose, center-tapped antenna and impedance matching network. A double loop of antenna wire 60 (preferably #24 gauge magnet wire) may be connected at about its center to a trimming capacitor $C_T$ and to amplifier 16 (filter 32 not shown.) The diameter of the double loop of wire 60 may be less than about three inches, and preferably is about two inches. This structure provides a parallel equivalent resistance, such as illustrated in FIG. 3b (which shows the circuit equivalent $L_A$ of the antenna of FIG. 3a when loaded and at 49 MHz), very near the parallel real part of the input to amplifier 16 (the circuit equivalent C of amplifier 16 being shown in FIG. 3c). As a result of this arrangement, only the single trimmer capacitor $C_T$ is needed to provide a conjugate impedance match between antenna 14 and amplifier 16. In other words, $$Z_{L_A} = -Z_C$$

where $Z_C = \frac{1}{j2\pi(C_T + C_1)49.88M}$

The arrangement of FIG. 3 also provides preselection filtering to mitigate large signal out-of-band interference in the compact receiver.

As will be appreciated, the selection of the OOK AM/DPSK waveform is significant to the ability to use the minimal circuitry described herein. In a preferred embodiment, the waveform is generated in transmitter 12 by first DPSK modulating data bits at 300 Hz. The DPSK modulated data bits are then on/off keyed at a 1.2 KHz AM rate. The composite OOK AM/DPSK signal is then used to modulate a 49.88 MHz carrier. By maintaining a high on\off ratio in transmitter 12 (greater than 60 dB, with greater than 80 dB being preferred), the compact receiver can operate over a dynamic input signal range exceeding 60 dB (or 80 dB in a preferred embodiment) without AGC. The omission of AGC simplifies the receiver design, thereby improving its producability and reducing cost. Further, by using DPSK modulation in the waveform, the benefits of low bit error rate in a simple data receiver at low signal-to-noise ratios may be achieved. DPSK modulation is also beneficial because data detection can be accomplished without circuitry associated with bit synchronizers found in BPSK or QPSK data receivers.

The components on ICs 44 and 46 were selected to provide the desired performance at micropower levels with efficient utilization of silicon area. A square-law detector was chosen for AM detection, instead of an envelope detector, to provide desired performance levels at low signal-to-noise ratios and because it is available in a simple monolithic circuit. While other arrangements of the components may be used, it has been found that IC cost is significantly reduced with the two ICs 44 and 46 as described above.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A data transmission system comprising a transmitter for transmitting an on/off keyed (OOK) AM/DPSK modulated data signal with an on/off ratio exceeding about 60 dB which has been modulated on a carrier; and a compact data receiver which operates without automatic gain control comprising, an antenna comprising a double loop of antenna wire, the loop being less than about three inches in diameter, and a trimmer capacitor which is connected to a center of said wire for providing a conjugate impedance match between said antenna and a low noise amplifier connected thereto;

a square-law detection AM demodulator for demodulating the amplified signal from said low noise amplifier; and a DPSK data detector circuit for digitally decoding the demodulated signal in order to provide the data signal as an output.

2. The system of claim 1, said receiver further comprising a bipolar silicon integrated circuit having therein said low noise amplifier and said square-law detection AM demodulator.

3. The system of claim 2, said receiver further comprising a digital CMOS integrated circuit having therein said DPSK data detector circuit which comprises delay means for delaying data in the demodulated signal by one bit and a multiplier for decoding the demodulated signal by multiplying the delayed signal times the undelayed demodulated signal.

4. The system of claim 1 wherein said data signal has a frequency of about 300 Hz, said on/off keying is at about a 1.2 KHz rate, and said carrier has a frequency of about 49 MHz.

5. The system of claim 1 wherein said transmitter provides an on/off ratio exceeding about 80 dB.

6. A data communication method comprising the steps of:

(a) DPSK modulating an input data signal;

(b) on/off keying the DPSK modulated signal at a first AM rate with an on/off ratio of at least 60 dB, to produce an OOK AM/DPSK signal;

(b) modulating the OOK AM/DPSK signal onto a carrier;

(c) transmitting the modulated carrier;

(d) providing a conjugate impedance match between a double loop wire antenna receiving the transmitted signal and a low noise amplifier connected thereto, the antenna being center tapped to a trimmer capacitor for impedance matching;

(e) demodulating the signal from the low noise amplifier with a square-law detection AM demodulator in a bipolar silicon integrated circuit; and (f) decoding the demodulated signal with DPSK data detector circuit in a digital CMOS integrated circuit which delays data in the demodulated signal by one bit and multiplies the delayed data times the undelayed demodulated signal.

7. The method of claim 6 wherein the demodulating step further comprises the step of mixing the signal from the low noise amplifier with a first oscillator signal to provide a intermediate frequency output signal to the square-law detection AM demodulator.

8. The method of claim 7 wherein the decoding step further comprises the step of switchably connecting the square-law detection AM demodulator to a delay with a second oscillator.

9. The method of claim 8 where the data signal has a frequency of about 300 Hz, the first AM rate is about 1.2 KHz, the carrier has a frequency of about 49 MHz, and the intermediate frequency is about 20 KHz.

10. The method of claim 9 wherein the first oscillator operates at about 49 MHz and the second oscillator operates at about 72 KHz and has an output divided by 4.

11. A data receiver comprising:

an antenna comprising a double loop of antenna wire center tapped to a trimmer capacitor, said antenna for receiving an on/off keyed (OOK) AM/DPSK modulated several hundred Hertz data signal with an on/off ratio exceeding about 60 dB which has been modulated on a multi-megaHertz carrier, and for providing a conjugate impedance match between said antenna and a low noise amplifier connected thereto;

an AM demodulator circuit comprising a bipolar silicon integrated circuit having therein said low noise amplifier for amplifying the signal from said antenna and a square-law detection AM demodulator for demodulating the amplified signal; and a DPSK data detector circuit comprising a digital CMOS integrated circuit having therein delay means for delaying data in the demodulated signal by one bit and a multiplier for decoding the demodulated signal by multiplying the delayed signal times the undelayed demodulated signal, said data detector circuit for providing the several hundred Hertz data signal as an output.

12. The receiver of claim 11 wherein said bipolar silicon integrated circuit further comprises a mixer connected to said low noise amplifier and a first oscillator connected to said mixer, said mixer for providing a multi-kiloHertz, intermediate frequency output signal to said square-law detection AM demodulator.

13. The receiver of claim 12 wherein said digital CMOS integrated circuit further comprises a switch for switchably connecting said square-law detection AM demodulator to said delay means, and a second oscillator for operating said switch.

14. The receiver of claim 13 wherein said data signal has a frequency of about 300 Hz, said on/off keying is at a 1.2 KHz rate, said carrier has a frequency of about 49 MHz, and said intermediate frequency is about 20 KHz.

15. The receiver of claim 14 wherein said first oscillator operates at about 49 MHz and said second oscillator operates at about 72 KHz and has an output divided by 4.

16. The receiver of claim 11 further comprising a battery for powering the receiver.

17. The receiver of claim 11 wherein said double loop of antenna wire has a diameter of about two inches.

18. A data transmission system comprising a transmitter for transmitting an on/off keyed (OOK) AM/DPSK modulated data signal which has been modulated on a carrier; and a compact data receiver which operates without automatic gain control comprising, an antenna comprising a double loop of antenna wire and a trimmer capacitor which is connected to a center of said wire for providing a conjugate impedance match between said antenna and a low noise amplifier connected thereto;

a square-law detection AM demodulator for demodulating the amplified signal from said low noise amplifier; and a DPSK data detector circuit for digitally decoding the demodulated signal in order to provide the data signal as an output.

19. The system of claim 18, said receiver further comprising a bipolar silicon integrated circuit having therein said low noise amplifier and said square-law detection AM demodulator.

20. The system of claim 19, said receiver further comprising a digital CMOS integrated circuit having therein said DPSK data detector circuit which comprises delay means for delaying data in the demodulated signal by one bit and a multiplier for decoding the demodulated signal by multiplying the delayed signal times the undelayed demodulated signal.

21. The system of claim 18 wherein said on/off keying is at a rate four times that of the said data signal frequency.

22. The system of claim 18 wherein said transmitter provides an on/off ratio exceeding 60 dB.

* * * * *